UNITED STATES PATENT OFFICE.

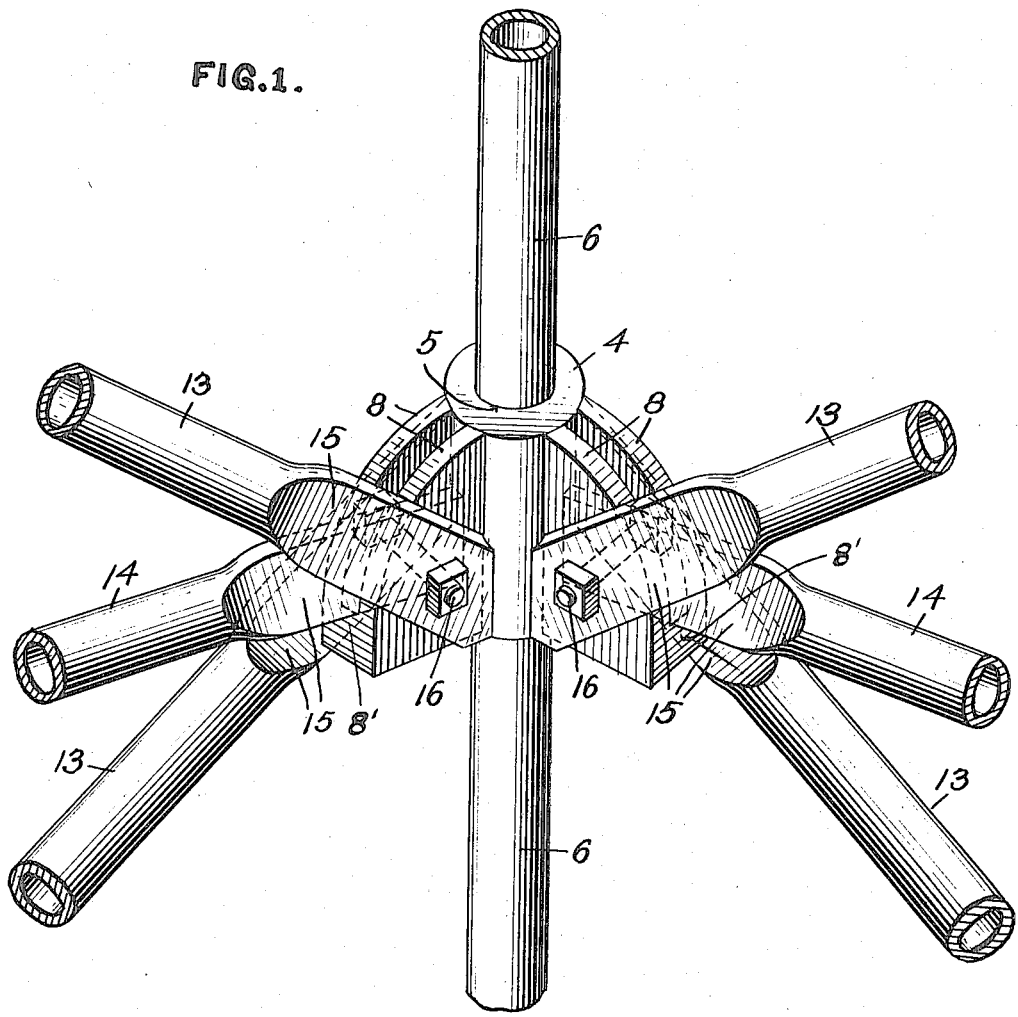

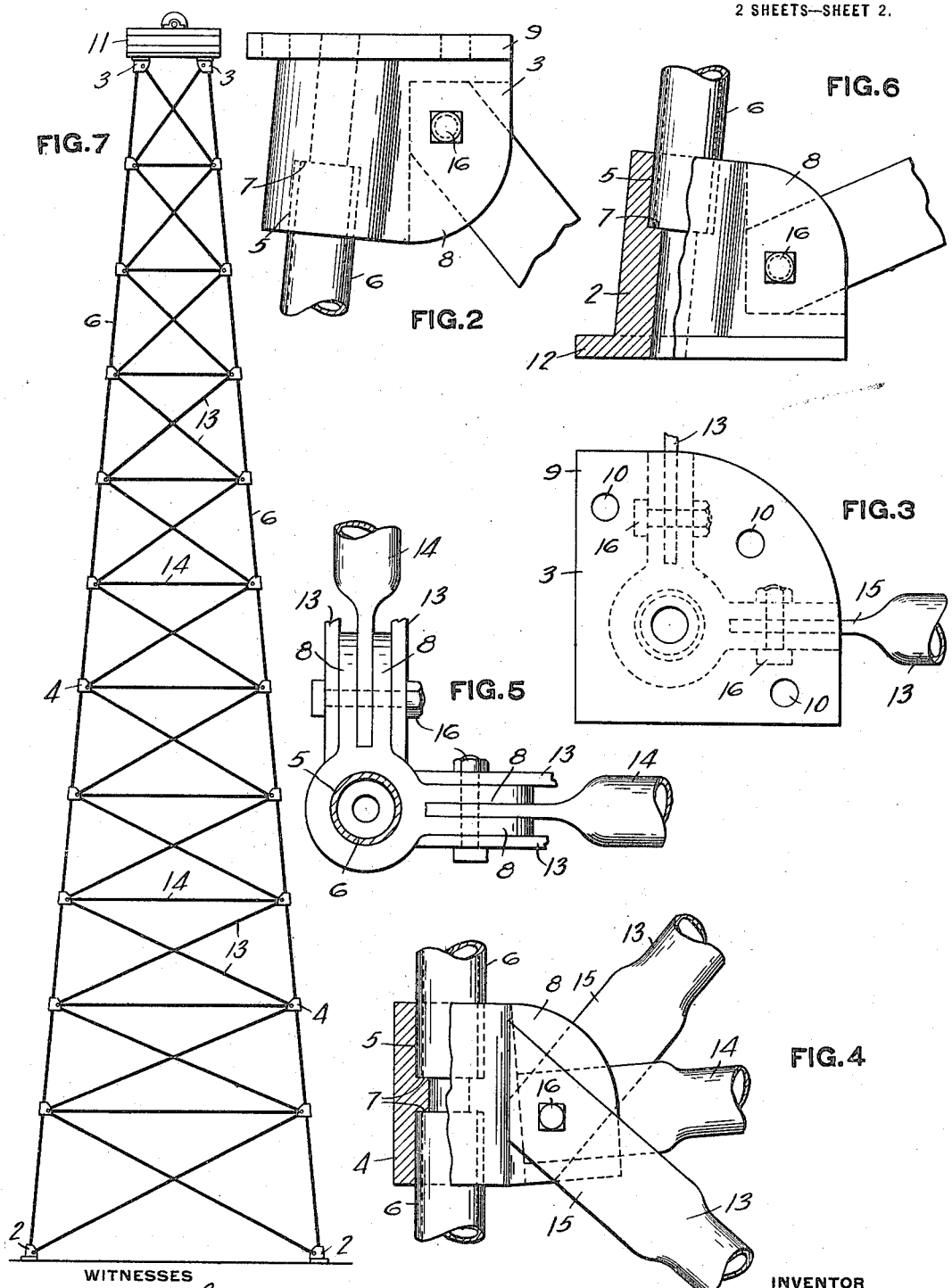

ADELBERT DAVIS KIGHTLINGER, OF WASHINGTON, PENNSYLVANIA.

DERRICK.

1,221,747.      Specification of Letters Patent.      Patented Apr. 3, 1917.

Application filed April 16, 1915. Serial No. 21,627.

*To all whom it may concern:*

Be it known that I, ADELBERT D. KIGHTLINGER, a citizen of the United States, residing at Washington, in the county of Washington and State of Pennsylvania, have invented certain new and useful Improvements in Derricks, of which the following is a specification.

My invention consists of an improvement in derrick construction for oil well, wind mill or other derricks, and particularly refers to the joint construction for connecting the main corner upright members and the several brace members.

One of the objects in view is to provide a corner joint member adapted to use with sectional corner uprights of ordinary unthreaded pipe sections, and having means for connecting the several horizontal and diagonal braces, as hereinafter more fully described.

The construction has in view to provide a derrick which can be built of sections of commercial pipe having socketed engagement in corner joint members, and also brace sections of pipe, or flat bars, having bracing connection with the same members by lateral flanges or wings thereof, the terminal top and bottom corner members also having horizontal plate portions for attachment to a top structure and a supporting base respectively.

Referring to the drawings,—

Figure 1 is a perspective view of one of the joints, showing the post members, braces and girts broken away.

Fig. 2 is a detail view in side elevation of one of the top joint members.

Fig. 3 is a plan view of Fig. 2.

Fig. 4 is a detail view in sectional elevation of one of the corner bracket members as used between the top and bottom members.

Fig. 5 is a plan view of Fig. 4.

Fig. 6 is a detail view in sectional elevation of one of the corner base members.

Fig. 7 is a diagrammatic view in elevation of a complete derrick embodying the invention.

The derrick as a whole comprises corner base joint members 2, corner top joint members 3, and intervening corner joint members 4, preferably of cast metal. Each of said members is provided with cylindrical sockets 5 for the insertion of the ends of pipe sections 6 which abut against shoulders 7 of the joint members and have a bearing support thereby. The intervening joint members 4 are provided with double shoulders 7 as shown, the same being provided by reducing the diameter of the pipe receiving opening whereby to provide the off-set shoulder bearing, as readily seen.

Each corner joint or connecting member, 2, 3 and 4, is provided with two pairs of laterally extending wings or cheeks 8, 8, spaced apart and adapted to receive between them the flattened terminal of the brace member, one pair being arranged in a direction at right angles to a similar pair, extending vertically and laterally from the corner member.

In the case of the top members, the wings 8 merge into a top plate 9 having bolt holes 10 for attachment with the top or coping 11 of the derrick, the base members 3 having a similar plate 12 provided with similar bolt holes for attachment to a supporting base or platform. Intermediate joint members 4 are provided at one end with a cross web 8' connecting the wings 8 and forming a bearing for the edge of the flat terminal of girt 14.

The several transverse bracing members, comprising the diagonal braces 13 and the horizontal girts 14 are also preferably made of pipe sections having their terminal portions flattened, as indicated at 15. These flattened terminals are adapted to be inserted either between the cheeks or against their outer faces, and are connected with the cheeks by bolts 16 extending through the several cheeks and terminals, as clearly shown.

The horizontal braces or girts 14 lie between the cheeks and are squared at their inner ends whereby to abut against the vertical faces 16 of the several intervening joint members 4. The terminals of the braces 13 lie against the outer faces of the cheeks, and their inner ends are cut off angularly to provide a similar bracing connection against the face of the several members, the uppermost terminals of the upper set and the lowermost terminals of the lower set of diagonal braces, however, being inserted between the cheeks of the upper joint members 2, and lower joint members 3 respectively, and against similar vertical faces 16' thereof.

By this arrangement, the several brace members are fixedly connected with the joint members and rigidly attached thereto, not only by the connecting bolts, but by their abutting terminals, effecting a stiff, rigid connection, whereby to brace the entire structure throughout its length.

The construction of the derrick as a whole is thus rendered extremely strong and durable. The several parts are of simple and cheap construction. The erection or taking apart of the derrick is rendered easy, and its rapid erection greatly facilitated, without the necessity of the cutting of any parts, use of threads, or special attachments of any kind other than as herein described.

The parts may be made of any desirable size, proportions or material, and the mechanism as a whole may be variously changed in different features of construction or design by the skilled mechanic, but all such changes are to be considered as within the scope of the following claims.

What I claim is:

1. A joint construction of the class described comprising a connecting member having a post socket and a pair of laterally extending wings, a plurality of bracing members having flat terminals one lying between and the others against said wings, and a single holding bolt extending through all of said wings and terminals.

2. A joint construction of the class described comprising a connecting member having oppositely disposed post sockets and a pair of laterally extending wings, post members inserted by their terminals in said sockets, a plurality of bracing members having flat terminals one lying between and the others against said wings, and a single holding bolt extending through all of said wings and terminals.

3. In a joint construction, a connecting member having oppositely disposed vertically arranged post sockets and a pair of laterally arranged wings spaced apart and joined at one end by a connecting web, post members inserted by their terminals in said sockets, a plurality of bracing members having flat terminals, one lying between said wings and abutting by its end against the connecting member and bearing by its edge against said connecting web, the others lying against said wings and abutting by their ends against the connecting member, and a single holding bolt extending through all of said wings and terminals.

4. In a derrick, the combination of base, top and intermediate corner joint members having sockets and sets of pairs of brace attaching wings, vertically arranged corner post members engaging said sockets, brace members converging toward said joint members having assembled flattened terminals one lying between and the others against said wings, and a single holding bolt extending through each pair of wings and all of its associated terminals.

5. In a derrick, the combination of sets of base members, top members, and intermediate corner joint members provided with shouldered sockets and sets of pairs of brace attaching wings, corner post members having their terminals engaging said sockets, and girt and brace members extending horizontally and diagonally between adjacent base, top, and intermediate corner joint members respectively and provided with converging assembled flattened terminals one lying between and the others against said wings and connected to said wings by a single bolt extending through each pair of wings and set of terminals.

6. In combination, four base members each having a bottom bearing portion and an upwardly opening inclined shouldered socket and pairs of brace attaching wings, series of four-fold sets of intermediate corner joint members each provided with oppositely disposed inclined shouldered sockets and pairs of brace attaching wings, four top members each having a top bearing plate and a downwardly opening inclined shouldered socket and pairs of brace attaching wings, girt and brace members extending horizontally and diagonally between adjacent base, top, and intermediate corner joint members respectively having flattened terminals one lying between and against said wings and abutting by their edges the others against said corner members, and a single bolt extending through each assembled set of said terminals and each pair of wings and connecting them together.

In testimony whereof I hereunto affix my signature in the presence of two witnesses.

ADELBERT DAVIS KIGHTLINGER.

Witnesses:
 JAMES P. EAGLESON,
 MARGARET McCUE.